3,249,101
COLLAPSIBLE CHARCOAL GRILL
Kenneth I. Weissman, 2958 Ave. Z, Brooklyn, N.Y., and
Allen Nudelman, 115 Haring St., Closter N.J.
Filed Dec. 9, 1964, Ser. No. 417,068
4 Claims. (Cl. 126—9)

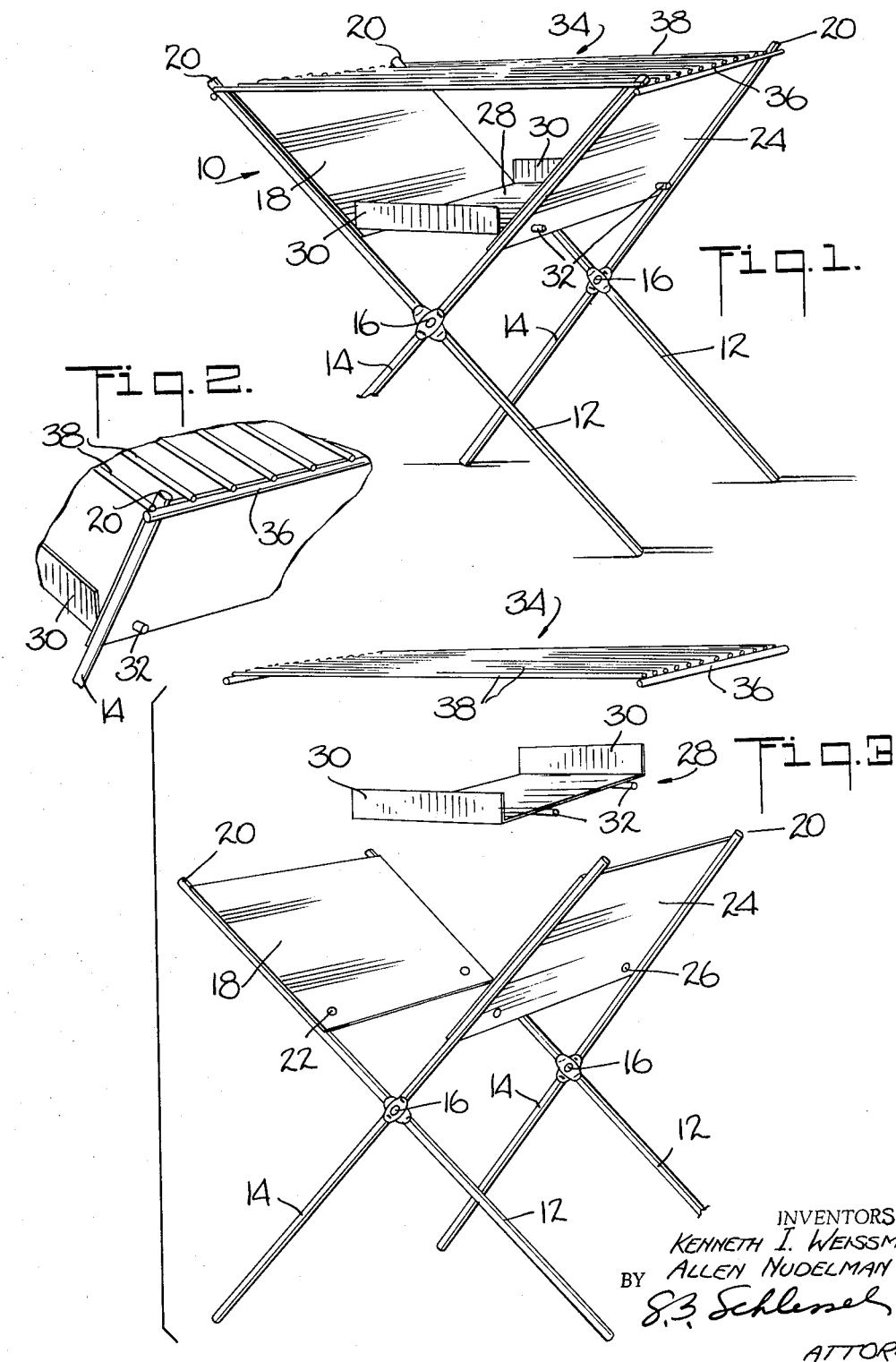

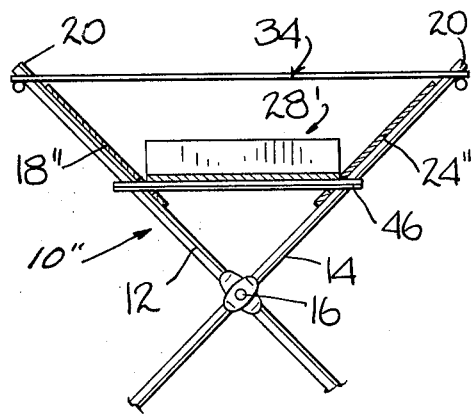
Fig. 4.
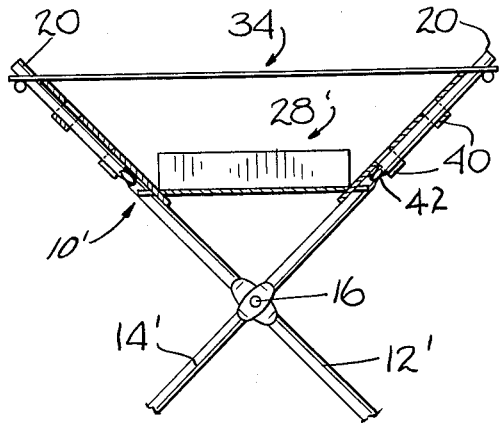
Fig. 6.
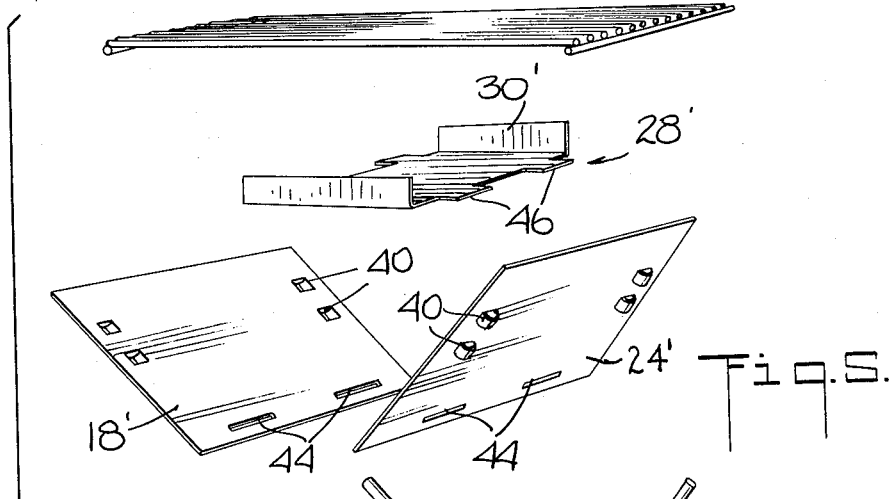
Fig. 5.
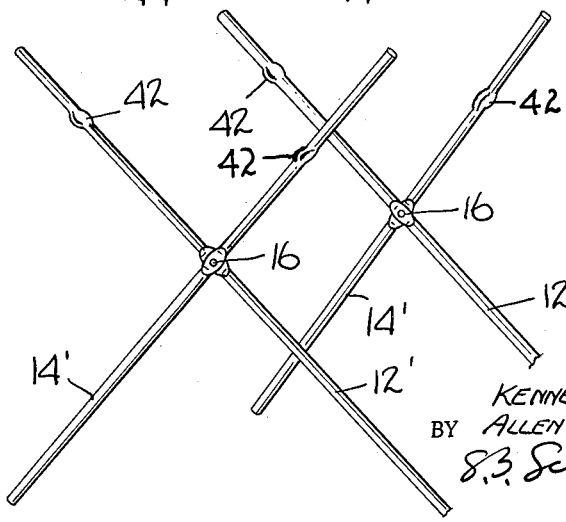
INVENTORS
KENNETH I. WEISSMAN
ALLEN NUDELMAN
BY
ATTORNEY ця
United States Patent Office 3,249,101
Patented May 3, 1966

This invention relates to the field of outdoor and picnic cooking, and has for its particular objective the creation of a small, collapsible, and portable charcoal grill which can be assembled quickly and easily for use, and which can be collapsed into a flat package for convenient storage in a small area when not required.

In the present state of the art numerous forms of outdoor grills have been produced. These, for the most part, are of large and rigid construction, intended for permanent outdoor installation. Those others, which are adapted to be folded for storage or carrying, are generally large and cumbersome even when collapsed, because of their size as well as their construction, and are fairly complicated in structure.

It is therefore the principal object of our invention to create a small, collapsible charcoal grill which can be easily and readily assembled for use, and adapted to occupy a small area in such use.

A second important object of our invention lies in the provision of a small, collapsible charcoal grill which can be readily and easily disassembled and folded into a flat package for storage in a small area.

Another important object of our invention lies in the provision of a collapsible charcoal grill which is extremely light in weight and easily portable, and which can be produced at small cost.

These and other salient objects, advantages and functional features of our invention, together with the novel features of construction, composition and arrangement of parts, will be more readily apparent from an examination of the following description, taken with the accompanying drawings, wherein:

FIG. 1 is a side perspective view of a preferred embodiment of our invention, partly broken away;

FIG. 2 is an enlarged fragmentary side elevational view showing how the grid member is supported on the frame of the grill;

FIG. 3 is an exploded view of the embodiment shown in FIG. 1;

FIG. 4 is a side view of a modified embodiment of our invention, partly broken away;

FIG. 5 is an exploded view of another modified embodiment; and

FIG. 6 is a side view of the embodiment shown in FIG. 5, partly broken away.

Similar reference characters designate similar parts throughout the different views.

Referring now to the embodiment shown by FIGS. 1–3, our collapsible charcoal grill 10 comprises two pairs of crossed legs 12 and 14 pivotally secured together, leg 12 to leg 14, at a point intermediate their ends by means of rivets 16. The upper portions of the legs 12 are secured together in parallel, spaced relationship by means of a plate 18, secured to the legs 12 by welding or similar means, with the legs 12 extending slightly above the upper edge of the plate 18 to form protruding ends 20, the plate 18 forming a side wall for the grill 10. A pair of openings 22 are provided in the plate 18 adjacent its lower edge. Similarly, the upper portions of the legs 14 are secured together in the same manner by means of a plate 24, which is similarly provided with openings 26 disposed in like manner as the openings 22 in the plate 18, the legs extending therefrom into protruding ends 20, and the plate 24 forming a side wall for the grill 10, angularly facing plate 18, as shown.

The grill 10 is further provided with a floor plate 28, of the same length as the plates 18 and 24, adapted to engage the lower converging edges of the plates 18 and 24 when positioned between them, to form a trough for the receipt and retention of the charcoal or other fuel to be used for cooking. The plate 28 is provided with end walls 30 adapted to form a pocket to contain the charcoal and a pair of transverse rods 32 on its undersurface, extending beyond the sides of the plate 28 and of a diameter to fit into the openings 22 and 26.

A grid 34, upon which food to be cooked is to be placed, is provided for the top of the grill 10, and comprises a pair of side members 36 secured together in parallel, spaced relationship by a plurality of parallel, spaced rods 38 which are welded at their ends to the side members 36, as shown in FIG. 2, the grid 34 is adapted to rest upon the upper edges of the plates 18 and 24 with the ends 20 protruding between the end rods 38 and side members 36.

In the assembly of our grill 10, the legs 12 and 14 are spread, as shown in FIG. 3, so that the plates 18 and 24 are at a converging angle to each other. The floor plate 28 is placed between the lower ends of the plates 18 and 24 so that its rods 32 are in registry with the openings 22 and 26 in the plates 18 and 24. The plates 18 and 24 are then pivoted toward each other until the rods 32 enter the respective openings 22 and 26 fully, the sides of the floor plate 28 thereby abutting the inner surfaces of the plates 18 and 24. Holding the assembly in this position, the grid 34 is then placed upon the upper edges of the plates 18 and 24 so that the ends 20 extend through the openings formed by the end rods 38 and side members 36 of the grid 34, the ends 20 thereby abutting the side members 36 and forced into this position by the tendency of the plates 18 and 24 to diverge. In this position the grill 10 is firmly locked into operative position, with the floor plate 28 preventing convergence of the plates 18 and 24, and the grid 34 preventing divergence of the plates 18 and 24 from such position. The charcoal may now be placed upon the floor plate 28 and ignited, and the food to be cooked thereafter placed upon the top of the grid 34.

In disassembling our grill 10, the grid 34 is removed from engagement with the ends 20, causing divergent collapse of the legs 12 and 14, with the accompanying plates 18 and 24, into a position of flat, parallel relationship to each other, with the plates 18 and 24 at opposite sides, and the floor plate 28 is thereby freed from its engagement with the plates 18 and 24. The plate 28 and grid 34 may now be placed on top of the collapsed legs 12 and 14, and the entire assembly inserted into a flat case, for storage or portage.

In the modified embodiment shown by FIGS. 5 and 6, the grill 10′ is provided with side plates 18′ and 24′ which are detachable from the respective legs 12′ and 14′. The plates 18′ and 24′ are provided with pairs of guide and retaining rings 40, which serve as guides through which the respective legs 12′ and 14′ are inserted to support the plates 18′ and 24′, the legs 12′ and 14′ being provided with stop members 42 to limit movement of the plates 18′ and 24′ beyond the desired position thereon, whereby the ends 20 extend above the upper edges of the plates 18′ and 24′. The plates 18′ and 24′ are further provided with lateral slots 44 in place of the openings 22 and 26 shown in plates 18 and 24, and the floor plate 28′ is provided with lateral extensions 46 which are adapted to enter the slots 44 in the same manner as the transverse rods 32 fit into the openings 22 and 26 in the embodiment shown by FIG. 3.

A further modification is shown by FIG. 4, wherein the grill 10″ is provided with side plates 18″ and 24″ which are integral with the legs 12 and 14 but are provided with lateral slots 44 adapted to receive the extensions 46 of the floor plate 28' to lock the elements together in the same manner as shown in the embodiment of FIGS. 5 and 6.

While the embodiments shown and described are preferred embodiments of our invention, it is clearly to be understood that they are not to be considered as limitations in any way, but that our invention encompasses all of the features of novelty within the scope of the disclosure. Various changes may be made in the construction, composition and arrangement of parts without limitation upon or departure from the spirit and scope of the invention, or sacrificing any of the advantages thereof inherent therein, all of which are claimed.

Having described our invention, we claim:

1. A collapsible charcoal grill comprising
   a first pair of crossed legs pivotally secured together intermediate their ends,
   a second pair of crossed legs pivotally secured together intermediate their ends,
   a side plate securing the upper portion of each of the first pair of legs to the upper portion of one of the second pair of legs in parallel spaced relationship to each other and disposed to act as a side wall for the grill, with the upper end of each leg extending above the upper edge of the engaged side plate,
   a floor plate disposed horizontally between the lower converging surfaces of the side plates,
   openings in the side plates near the lower surfaces thereof,
   the floor plate provided with a flat base, end walls and a pair of transverse rods upon the undersurface of the base and extending therefrom,
   the transverse rods adapted to come in registry with the side plate openings to support the floor plate on the side plates, and
   a grid comprising a pair of side members and a plurality of spaced parallel rods interconnecting the side members, the grid being superposed upon the upper edges of the side plates with the leg ends extending into the openings in the grid adjacent the end rods and side members thereof.

2. A collapsible charcoal grill comprising
   a first pair of crossed legs pivotally secured together intermediate their ends,
   a second pair of crossed legs pivotally secured together intermediate their ends,
   a side plate securing the upper portion of each of the first pair of legs to the upper portion of the second pair of legs in parallel spaced relationship to each other and disposed to act as a side wall for the grill, with the upper end of each leg extending above the upper edge of the engaged side plate,
   a floor plate disposed horizontally between the lower converging surfaces of the side plates,
   slots in the side plates near the lower surfaces thereof,
   the floor plate comprising end walls and a flat intermediate base provided with extensions adapted to come in registry with the slots in the side plates to support the floor plate on the side plates, and
   a grid comprising a pair of side members and a plurality of spaced parallel rods interconnecting the side members, the grid being superposed upon the upper edges of the side plates with the leg ends extending into the openings in the grid adjacent the end rods and side members thereof.

3. A collapsible charcoal grill as described in claim 1, the side plates being detachable from the respective legs,
   the side plates provided with guide rings upon their posterior surfaces adapted to receive and retain the respective legs therethrough to support the plates upon the legs and
   the legs provided with stop members to limit the movement of the side plates thereon to preselected positions.

4. A collapsible charcoal grill as described in claim 2, the side plates being detachable from the respective legs,
   the side plates provided with guide rings upon their posterior surfaces adapted to receive and retain the respective legs therethrough to support the plates upon the legs and
   the legs provided with stop members to limit the movement of the side plates thereon to preselected positions.

References Cited by the Examiner

UNITED STATES PATENTS

| 2,003,974 | 6/1935 | Pearson | 126—23 |
| 2,164,835 | 7/1939 | Pearson et al. | 126—25 |
| 2,486,708 | 11/1949 | Fader | 126—25 |

FREDERICK L. MATTESON, JR., *Primary Examiner.*

JAMES W. WESTHAVER, *Examiner.*

S. W. MILLARD, E. G. FAVORS, *Assistant Examiners.*